(12) United States Patent
Dripps et al.

(10) Patent No.: US 8,697,972 B2
(45) Date of Patent: Apr. 15, 2014

(54) METHOD AND APPARATUS FOR COMPUTER-MEDIATED TIMED SIGHT READING WITH ASSESSMENT

(75) Inventors: Michael W. Dripps, Minneapolis, MN (US); Daniel J. Massoth, Minnetonka, MN (US); Paul A. Sturm, Otsego, MN (US)

(73) Assignee: MakeMusic, Inc., Eden Prairie, MN (US)

( * ) Notice: Subject to any disclaimer, the term of this patent is extended or adjusted under 35 U.S.C. 154(b) by 57 days.

(21) Appl. No.: 13/563,721

(22) Filed: Jul. 31, 2012

(65) Prior Publication Data

US 2014/0033899 A1 Feb. 6, 2014

(51) Int. Cl.
*G09B 15/02* (2006.01)
(52) U.S. Cl.
USPC ............. 84/470 R; 84/477 R; 84/483.1
(58) Field of Classification Search
None
See application file for complete search history.

(56) References Cited

U.S. PATENT DOCUMENTS

| | | | | |
|---|---|---|---|---|
| 5,889,224 A | * | 3/1999 | Tanaka | 84/645 |
| 6,084,168 A | * | 7/2000 | Sitrick | 84/477 R |
| 6,166,314 A | * | 12/2000 | Weinstock et al. | 84/483.1 |
| 7,271,329 B2 | * | 9/2007 | Franzblau | 84/609 |
| 7,423,213 B2 | * | 9/2008 | Sitrick | 84/477 R |
| 8,338,684 B2 | * | 12/2012 | Pillhofer et al. | 84/470 R |
| 2009/0173213 A1 | * | 7/2009 | Jiang et al. | 84/484 |

* cited by examiner

*Primary Examiner* — Robert W Horn
(74) *Attorney, Agent, or Firm* — Fredrikson & Byron, P.A.

(57) ABSTRACT

A music sight-reading apparatus comprises a library of music to be displayed; a display unit for displaying music selected from the library to a user; a timer for displaying the sheet music for a predetermined time period before the user begins sight-reading the displayed music, an input for receiving signals representative of sound produced by the user doing a sight-reading performance of the displayed music; and apparatus for assessing correctness of the user's sight-reading and for preserving a record of the user's sight-reading performance.

23 Claims, 6 Drawing Sheets

METHOD AND APPARATUS FOR COMPUTER-MEDIATED TIMED SIGHT READING WITH ASSESSMENT

FIELD OF THE ART

The present subject matter generally relates to the field of tools and methods for music presentation for entertainment and education. The disclosure pertains to electronic appliances for sight reading notated music, such as sheet music, and has applicability, for instance, to music education.

BACKGROUND

As musicians read, prepare and perform music, and as music students learn to do so, it is important that they develop good sight reading skills. Sight reading is the ability to see a piece of notated music, such as sheet music, for the first time, and immediately play or sing the music with a high degree of accuracy. That degree of accuracy can be measured in terms of accuracy of pitches and rhythms. Additionally, it can include phrasing, dynamics, changes of tempo, etc. Sometimes a musician may have a limited amount of time to look over the music before starting to play or sing it. This can be the case in rehearsals, auditions and live performances. Auditions, for instance, may allow a fixed amount of time for the candidate to examine the music, before sight-reading it. In other circumstances, there may be no time at all, available for the musician to examine music before playing or singing it.

The ability to sight read well is recognized as an important skill for musicians, and is an important indicator of music literacy. Music literacy refers to the ability to read musical notation and to read notation at sight without the aid of a prior hearing. It is also something that can be intimidating for many musicians, because they are compelled to read and perform music without any advance preparation. Some musicians simply lack sight reading skills. Many more lack confidence in their sight-reading, and find it traumatic or stressful when they have to sight-read, particularly in high-stakes situations such as auditions or live performances.

As is the case with many other skills which improve with practice, sight-reading gets easier as the musician practices it, and gains experience. Musicians who are in situations in which they are regularly required to sight-read find that their skills improve. For instance, many singers find church choir work useful for developing sight-reading skills, because music for performance is "churned out" from week to week. While a certain degree of excellence of performance is achieved, the weekly pace of music preparation and performance is unrelenting, and sight-reading is continuously required.

While musicians find opportunities to improve sight-reading skills with teachers or accompanists, or within larger musical ensembles, it would also be possible for musicians to practice sight-reading alone.

SUMMARY

A music sight-reading apparatus comprises a library of music to be displayed; a timer for displaying the sheet music for a predetermined time period before the user begins sight-reading the displayed music, a display unit for displaying sheet music selected from the library to a user; an input for receiving signals representative of sound produced by the user doing a sight-reading performance of the displayed music; and apparatus for assessing correctness of the user's sight-reading and for preserving a record of the user's sight-reading performance.

Further features and advantages of embodiments of the subject matter disclosed herein, as well as the structure and operation of preferred embodiments, are described in detail below with reference to the accompanying exemplary drawings.

DETAILED DESCRIPTION

The subject matter given herein includes references to commercial products offered under product names for which trademark rights may apply. Where applicable, such trademark rights are the property of their owners of record.

The discussion of the apparatus and method described herein will focus on sight-reading, since that is a foreseeable application to which embodiments may be placed. However, it will be understood that this is not intended to be limiting. Rather, a variety of uses relating to reading and playing music, such as preparation of music being rehearsed for performance, or traditional learning situations, may employ apparatus and methods as described herein.

The discussion of various embodiments which follows will refer to "sheet music". However, it will be understood that this terminology is for example, and is not intended to be limiting. Rather, the discussion is intended to apply, more broadly, to music represented in notated form, whether it is fixed in hard-copy form (as the term "sheet music" has traditionally been used), in electronic form such as an image file or as notation represented symbolically, such as from a music notation editor software application, etc. Also, where such terminology is used, it will be further understood, without limitation, that the content thereof can include musical exercises, pieces of music, excerpts from pieces of music, etc. Embodiments of the subject matter disclosed and/or claimed herein have applicability to electronic appliances which may display notated music.

Also, the discussion which follows will refer to "sight-reading". While it is contemplated that users will employ embodiments for sight-reading, this also is not intended to be limiting. Rather, embodiments may be used for music learning, preparation for performance, repetitive practice for preparation and memorization, and other such purposes. Additionally, the term "sight-reading" is intended broadly to encompass instrumental reading, vocal sight-singing, and other suitable forms of musical expression.

The discussion which follows will also refer to "performance" or to "sight-reading performance." Here, the word "performance" is intended to be not limited to performance before an audience. Rather, it is intended to refer to the performance, or achievement, of a user/student in doing an exercise or assignment. Thus, the intention is that the term "performance" refer, for instance, to how a student performed in the course of doing as school assignment, taking a test, etc.

Block Diagrams of an Electronic Appliance Embodiment

Figure 1:
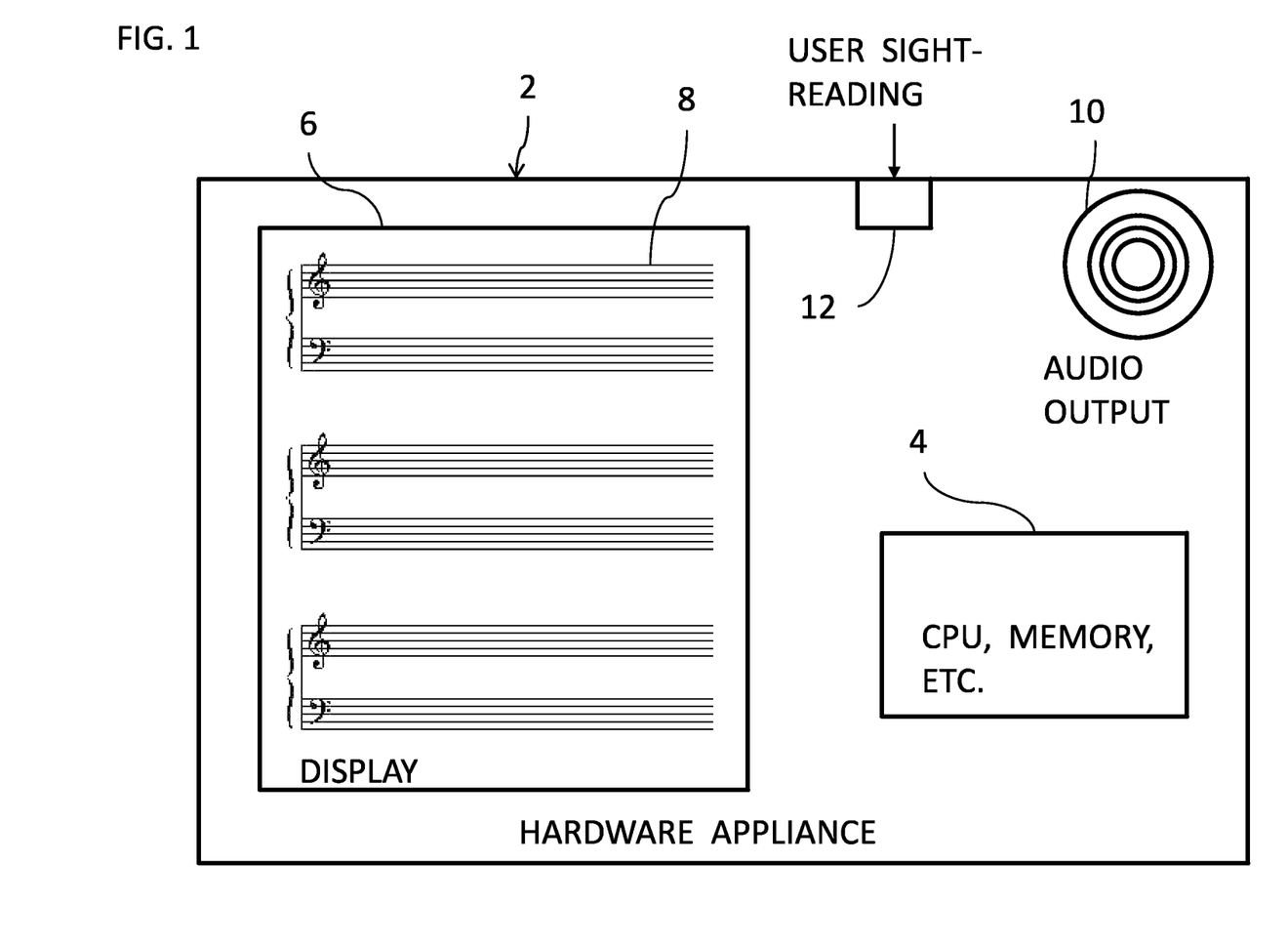
FIG. 1 is a system block diagram of an apparatus, according to an embodiment, for presenting music for a musician to sight-read.

FIG. 1 is an illustrative block diagram of an electronic hardware appliance embodiment. A hardware appliance 2, also called a hardware platform herein, such as an electronic book, computer, etc., includes conventional processing components, shown here collectively as 4, including a central processing unit (CPU), system memory, etc. A display 6 is provided, which may include a video screen, LCD display, etc. In various embodiments such as those to be described elsewhere herein, the display 6 may display notated music, such as a digital representation of sheet music in image file form, symbolic form, etc. For illustrative purposes, the displayed music is here shown as music staves 8. An audio output 10 is provided. While this is shown schematically, it may include separate stereophonic speaker outputs, a jack for coupling to an audio headset or earphones, a wireless interface to a public address system, etc. An input 12 is provided for receiving information or signals regarding the user's music sight-reading, such as audio signals, and may include a microphone for receiving sound, an electronic input for receiving electronic signals from an instrument such as an electronic keyboard, etc. The appliance 2 also has a suitable user command interface to allow the user to input commands to access data files, select and run software applications, etc. The user command interface could include a physical or logical keyboard or keypad, touch screen, game control or motion control interface, cursor pointing and clicking device, etc., as well as a tool bar or other graphical representation of controls, parameters, libraries, menus, that the user can use or select.

The displayed music and the input and output audio information will be described in more detail below. That information is stored within the memory of the processing components 4. It may be loaded from a physical medium such as a pre-recorded CD, or by a download from an external source such as a remote storage device, over the Internet, etc.

Figure 2:
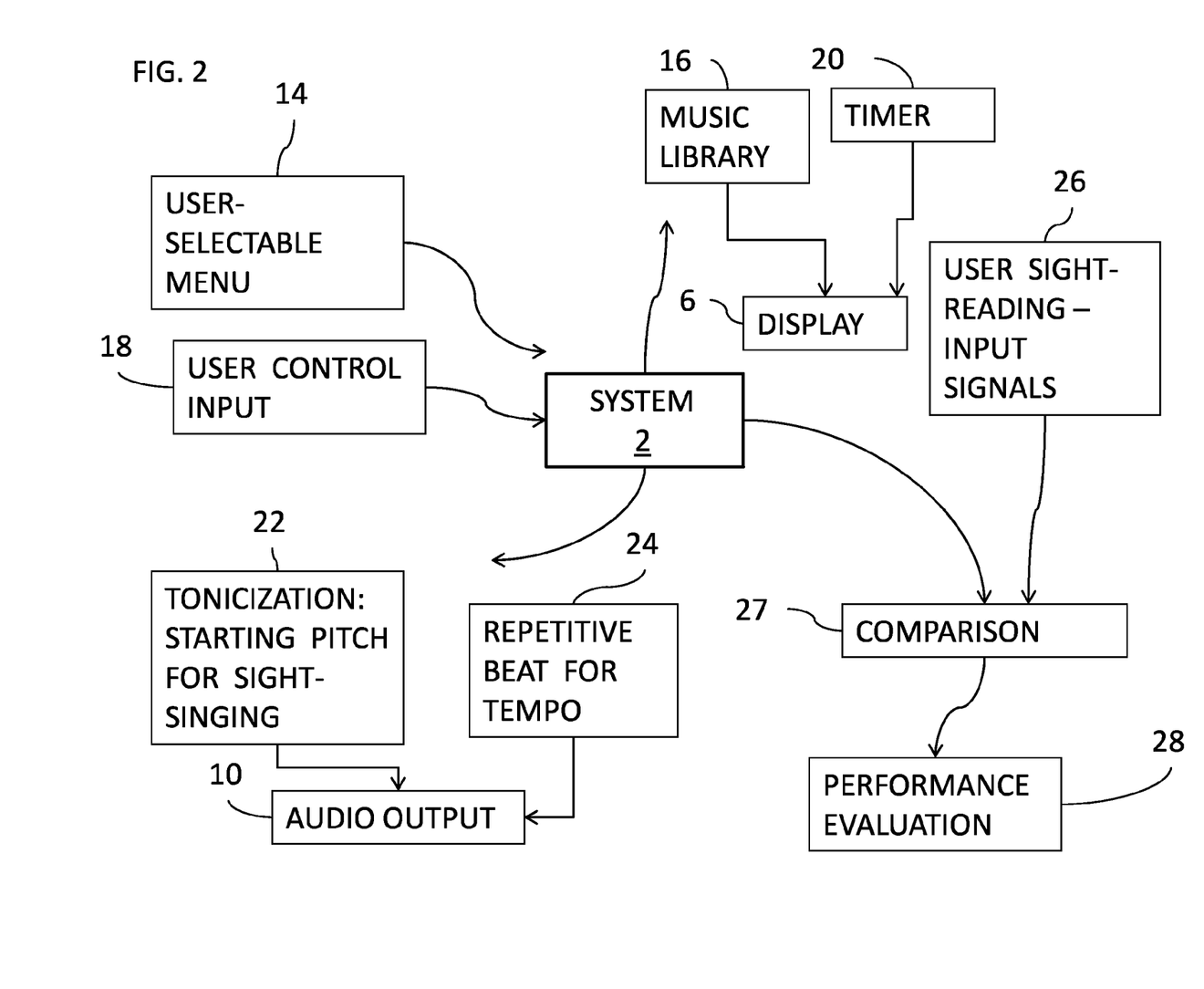
FIG. 2 is a more detailed system block diagram of an apparatus, such as that of FIG. 1, showing user inputs and outputs, and various aspects of system functionality.

FIG. 2 is a block diagram showing further details of an appliance such as that of FIG. 1, along with user interfacing, software applications and data structures for operation of an embodiment. FIG. 2 shows a system 2, which essentially represents the hardware appliance 2 of FIG. 1. The remaining elements shown in FIG. 2 may be thought of as an "exploded" view of the hardware appliance 2, including inputs, outputs, functionality and internal architecture.

A user-selectable menu 14 allows the user to control the functionality of the appliance 2. For instance, the menu 14 is displayed on the display 6 or in other suitable fashion. The user may select a sight-reading exercise, by selecting an existing piece of music, excerpt or exercise from a music library 16. The music library 16 may include music for any of the following: voice, woodwind, brass, percussion, strings, and keyboard. Keyboard music can include electronic instruments such as a MIDI electronic keyboard. Alternatively, the music to be sight-read may come from other sources and may be chosen based on parameters such as length, difficulty, and particular musical elements (such as key, pitches, rhythms, etc.) which are to be the focus of the sight-reading practice. A user control input 18 may provide the user with such selectable parameters, and may be in the form of a set of menus, numerical inputs, graphical interfaces such as slider bars or selectable icons, etc.

For a typical sight-reading exercise, the user or the appliance 2 selects a piece of music, views it for a specified period of time, and then commences playing or singing the music. The appliance 2 may reveal the piece of music for a specified time, which may be user-selectable, using a timer 20 to control the time the music is displayed on a user-viewable display, here shown as the display 6 of FIG. 1. The music is not shown before it is revealed as described, so the amount of time the user has to view the music is limited. For instance, when the user signals that he/she is ready to begin the sight-reading exercise, the music may appear on the display 6 for the specified period of time. Immediately afterwards, the user begins sight-reading, and the appliance 2 monitors the user's performance, in a manner described in more detail below.

In an embodiment, when the user selects a piece of music from the library 16, the music file for the selected piece is opened, but not yet displayed. Rather, the display may show a set of instructions, which may for instance be presented as a graphical image of an instruction card, superimposed over the music to cover up the music notation that is to be read. The instructions may include menus of user-selectable parameters, such as tempo, length of study time period, key transposition, etc. Alternatively, instructions and menus of parameters may be presented as separate images, for instance represented graphically as separate cards. Where the sight-reading exercise was assigned by a teacher, the parameters may have been pre-set by the teacher, in which case the instruction card may state the pre-selected values, or notify the user that the parameters have been pre-set and may not be changed by the user. The card may also display the teacher's instructions for performing the exercise.

When the user is ready to begin, he/she signals to the appliance 2 by entering Start into a graphical user interface, for instance by hitting a Start softkey. As of this point in time, the music becomes visible to the user, and the specified period of time for viewing before sight-reading begins to run. If the user is performing an exercise whose results will be evaluated, recorded, or graded, then from this Start point until conclusion of the sight-reading exercise, the user cannot pause or abort the exercise.

When the user signals (for instance, through the user control input 18) that he/she is ready to begin, the appliance 2 may provide a starting pitch 22 for sight-singing, and/or a repetitive beat 24, to set a tempo at which the user is to sight-read the music. More broadly speaking, the starting pitch 22 is a form of tonicization, defined as the providing of a pitch, arpeggio, scale, etc, sufficient to provide the user with a sense of what the first pitch or pitches should sound like. Such tonicization is useful for vocalists (i.e., singers), but generally not needed for instrumentalists. Accordingly, it may be provided for singing but omitted for instrumental playing. The starting pitch 22 and the beat 24 may be provided through an output, here shown as the audio output 10 of FIG. 1. The beat 24 may alternatively be provided electronically or optically, such as by a repeating sequence of light pulses through the display 6 or by other suitable means.

The user then commences sight-reading the displayed music. A visual cue, such as highlighted measures, notes or beats, or a cursor superimposed on the displayed sheet music, progresses through the music in synchronization with the user's sight-reading. The moving visual cue helps the user keep his/her place in the music, and helps the user to avoid getting far enough ahead or behind that his/her musical notes and rhythms are perceived as wrong because of the displacement ahead or behind where the appliance expects the user to be in the music. Multiple pages may be displayed in sequence, advancing automatically at the appropriate points in the music. The appliance 2 receives the user's sight-reading performance through an input such as the input 12, shown schematically in FIG. 1. In many cases this will be through the use of an audio input such as a microphone, together with suitable apparatus for pitch and rhythm detection, or detection of other musical elements. Alternatively, it could be through an electronic input, if an electronic instrument such as an electronic keyboard is interfaced with the appliance 2. This electronic interfacing may be in known fashion, and may use a known musical interface such as MIDI. In FIG. 2, the user's sight-reading performance, received in whichever fashion, is shown as user sight-reading input signals 26.

In accordance with an embodiment, the appliance 2 does a performance evaluation of the user's sight-reading, including comparing the user's sight-reading performance with the music as written, using a comparison apparatus 27 which may be a software routine which recognizes the user's performance from the input 12, translates the recognized performance into frequency, amplitude and confidence components and then compares this with the musical score using a series of matching and filtering algorithms, to make a determination as to which musical elements of the user's performance are correct and which are incorrect. Information in the user input signals, such as background noise or the particular overtone sequence produced by the voice or instrument, are examples of elements which may influence whether a musical element is determined to be correct or incorrect. Where different constructions of the user's input are possible, in an embodiment the various possible constructions are assessed to determine which construction is closest to the value received from the user's performance. Then, that closest construction is chosen. For instance, if background noise from the accompaniment registers as a possible construction in addition to the user's performance, the construction from the user's performance is selected because it will generally have a higher confidence value. The result is matched to the musical score, or alternatively to a reduced version of the musical score which has been filtered by events that are capable of being graded suitable algorithms, for instance limited to pitches and rhythms. The result of this comparison is in the form of a record of correct and incorrect musical elements, which may then be scored, for instance as a percentage of correct musical elements. The record, or score, is used to form a list of notes that match and extra notes that do not match which is superimposed on the musical notation. For FIG. 2, the performance evaluation is shown schematically as 28.

In an embodiment, performance evaluation may include displaying the music notation with indicia of whether music elements have been played correctly or incorrectly. For instance, if a melodic line is played or sung, the displayed notes can be color-coded to indicate whether the correct pitches were played or sung. For example, correct pitches and rhythms are shown in green, while incorrect pitches and rhythms are shown in red. Incorrect pitches are notated on the staff at the position that indicates the actual pitch performed, when possible. Incorrect rhythms are notated to the left of the original note when performed early, and to the right when performed late, when possible. Any such errors which are detected as the performance proceeds will be stored for display at the end of the sight-reading exercise. Also, a record of the sight-reading may be maintained, and later transferred or uploaded for archiving or grading purposes. These features may have utility if such apparatus and methods are used for formal education purposes, in which grading and other accountability for progress are needed.

Such color-coding or other indicia may be implemented through use of symbolic representations of music notation elements. Accordingly, the following is a discussion of representations of music notation which may be employed.

Figure 3:
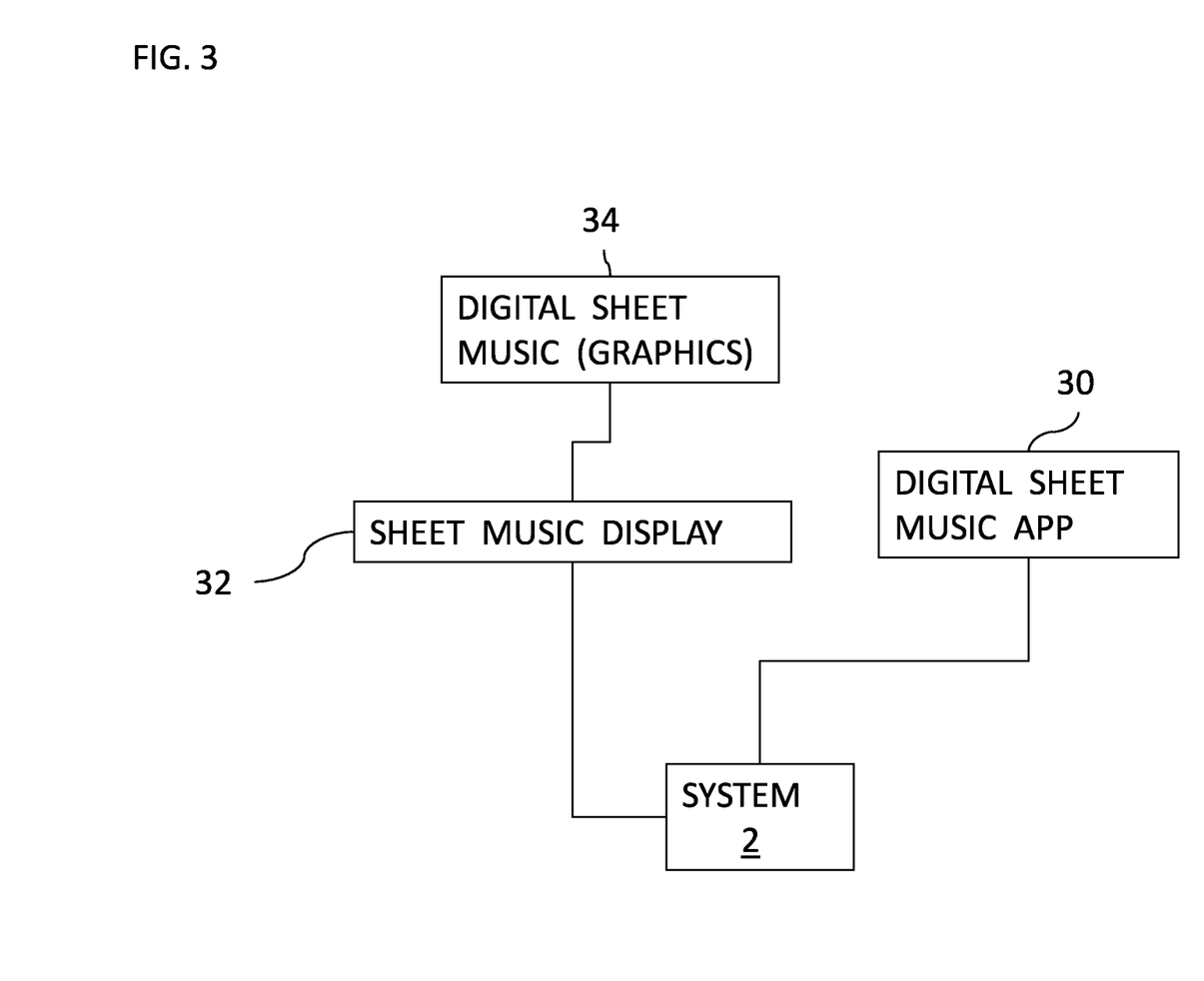
FIG. 3 is a more detailed system block diagram of an apparatus, such as that of FIGS. 1 and 2, showing additional aspects of display of representations of notated music.

FIG. 3 is a block diagram of an appliance such as that of FIGS. 1 and 2, showing how representations of sheet music may be displayed. As before, a system 2 is shown, which may be the appliance of FIG. 1. The system 2 may include software, or the like, for a digital sheet music application, shown as 30. A sheet music display 32 is also provided, which may include the display 6 of FIGS. 1 and 2. A digital graphics representation 34 of a piece of sheet music may be one of many such representations of sheet music, selectably stored in the music library 16 of FIG. 2. An electronic appliance such as the appliance 2 of FIG. 1 may have, installed and running thereon, an application 30 for supporting digital sheet music. The appliance 2 could be a computer or an electronic appliance such as an iPad, running a mobile operating system such as iOS ("iPhone Operating System" originally developed by Apple, Inc.). The application 30 could, for instance, be the application SmartMusic provided by MakeMusic, Inc., or equivalent.

Representations of Sheet Music: Symbolic Notation

Musical notation is used, in the generic sense, to refer to any way of conveying musical performance instructions including but not limited to common musical notation with staffs, notes, sharps, flats, and clefs, extending to written instructions in text form to supplement this or supplant or partially replace, as well as alternate forms of expression such as chord charts, words and chords (letters), tablature, jianpu and other number notations, any video, graphic, audio, audiovisual or other display presentation or combination of the aforementioned types of presentations.

Music notation may be thought of as an x-y coordinate system, in which time moves forward from left to right, and pitches are given in terms of their vertical position, high position for high-pitched notes, and low position for low-pitched notes. A staff, consisting of an array of horizontal lines, provides a frame of reference for relative pitches, and for a time sequence. A musical note is positioned on the staff (either on a line or between two adjacent lines) to indicate its pitch. So, for instance, an upward moving scale is notated as a sequence of notes, running from left to right on the staff, each successive note being on the next higher line, or space between lines, than its predecessor.

Timing may be notated on the staff by bar lines, vertical lines that segment the music into manageably small time intervals called measures or bars. A pattern of musical beats, such as ONE-two-three-ONE-two-three . . . , may be represented as a time signature at the beginning of a line, to represent the beat pattern, and bar lines interspersed in the music to indicate boundaries between measures of music, each measure having one ONE-two-three sequence. Pitches may be modified by associating symbols (sharps and flats) with individual notes. Numerous other notational elements, such as dynamic markings, phrasing, tempo changes, etc., may also be used.

Although notation may be thought of as an x-y coordinate system, the physical limits of page or screen size usually require dividing the music up into discrete units called systems which represent a continuous portion of the time of a performance. Systems of notated music may be thought of as equivalent to lines of text on a page. Just as a person would read text from the page one line at a time, left to right and then down to the next line, so music is read, or played, one system at a time. Each system contains one or more staves of music, each of the staves representing the music played by one or more instruments. Systems are ordered sequentially across a succession of pages or screens. Unlike paragraphs of text that may be split across multiple pages, a system does not split across pages. To reduce page turns or display updates, this can involve making formatting decisions such as omitting the staves for instruments that do not play during a particular system. Such a step saves vertical space and allows more systems to be placed on a single page.

Traditionally, composers, arrangers and copyists have written out by hand all of this music symbology onto manuscript paper, printed with only blank staves. Computer systems for music notation have made their jobs much easier, by providing a symbolic representation of common Western music notation. Rather than capturing the performance concepts of MIDI, such as system captures the pitch, rhythm, and other concepts represented on a printed page of sheet music (e.g. MusicXML, Finale, Sibelius). A graphics representation of the appearance of the sheet music may be produced with vector graphics such as SVG format, or with bitmap files such as PNG format. The vector graphics and bitmap approaches can both be used in PDF files, singly or in combination.

A system of music representation captures all of the above information, and more, and make it visible and legible to the user. This may be done by bit mapping, or by a symbolic system which gives the user more ease and control. A symbolic notation file represents music in terms of musical concepts relevant to performers who read music. This is the type of representation used in music notation applications like Finale and Sibelius, or digital sheet music applications like MusicNotes and Legato.

Many types of music applications use symbolic notation formats:

Notation editors like Finale and Sibelius are used both to compose music and to prepare music for performance and publication.

Music scanners like SharpEye Music Reader, SmartScore, and PhotoScore convert printed music into symbolic notation format using optical music recognition (OMR), similar to converting printed text into computer text files using optical character recognition (OCR).

Sequencers like Cubase and Logic combine audio and symbolic formats for composers who work more independently of music notation. Though they have limited support for notation, MIDI is the symbolic format of choice for these applications. Sequencers focus on sound output whereas notation editors focus on printed output. Notation-based sequencers like Notion are bridging the gap between these two categories.

Digital music stands like MuseBook Score and OrganMuse display music electronically, listen to the performance, and automatically turn pages as needed.

Digital sheet music applications like MusicNotes and Legato are used to sell sheet music online. They usually offer the ability to play a piece of music and transpose it into a particular key before printing the file.

In an embodiment, a symbolic music notation representation (optionally with audio as well) is converted into an electronic book representation that combines audio and graphic representations in a single file. If the symbolic representation is notation-based, rather than performance-based like MIDI, then acceptable visual quality is achieved in the graphic representation. If the sound played back in the electronic book is from an audio file, rather than from a MIDI file, then acceptable and consistent sound quality is achieved during playback. The ability of notation representations to convert and correlate both to audio and to graphics representations facilitates the production of audio sheet music in an electronic book format.

Sight-Reading by a User

Figure 4:
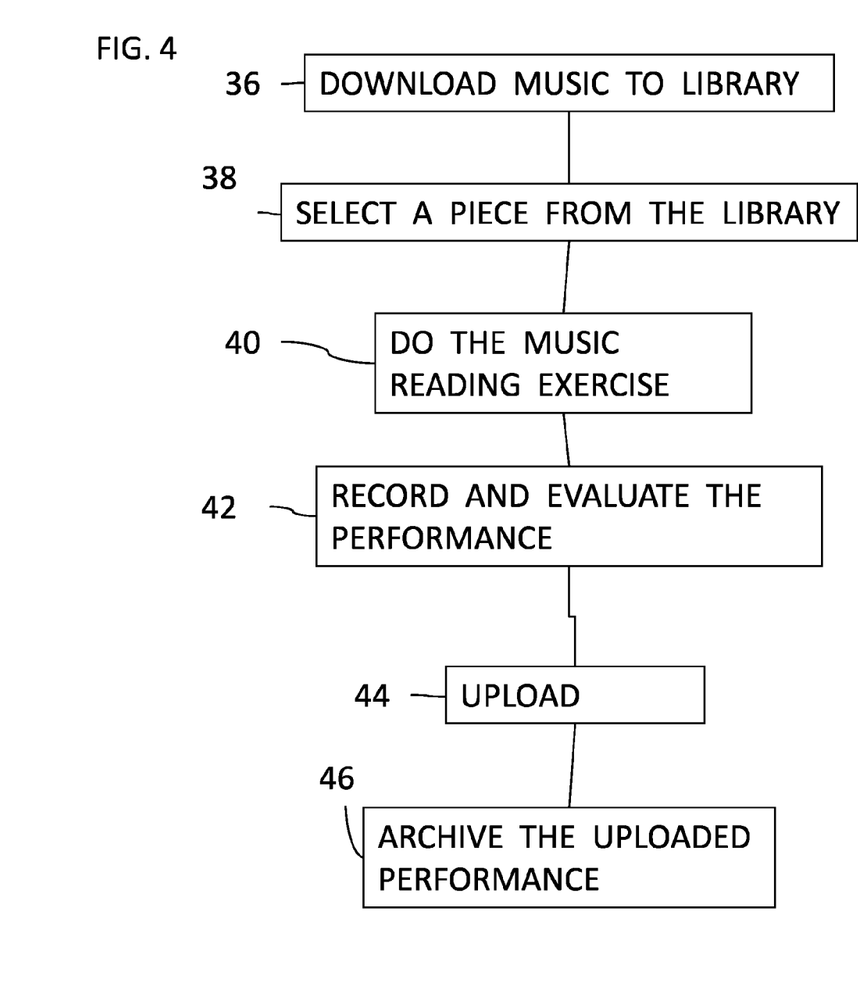
FIGS. 4, 5, and 6 are flowcharts showing aspects of methods for configuring and using an appliance such as that of FIGS. 1 through 3.
Figure 5:
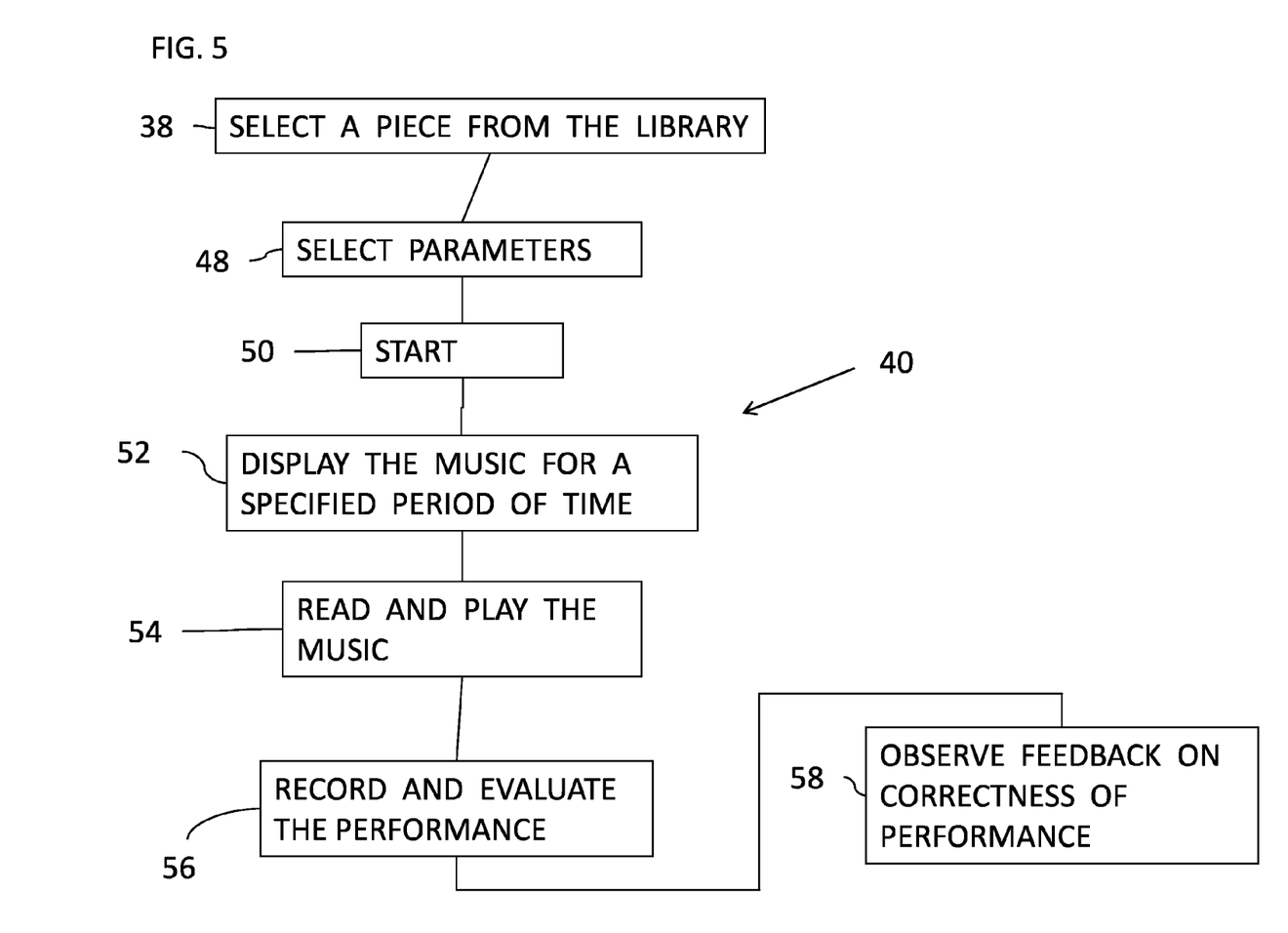
Figure 6:
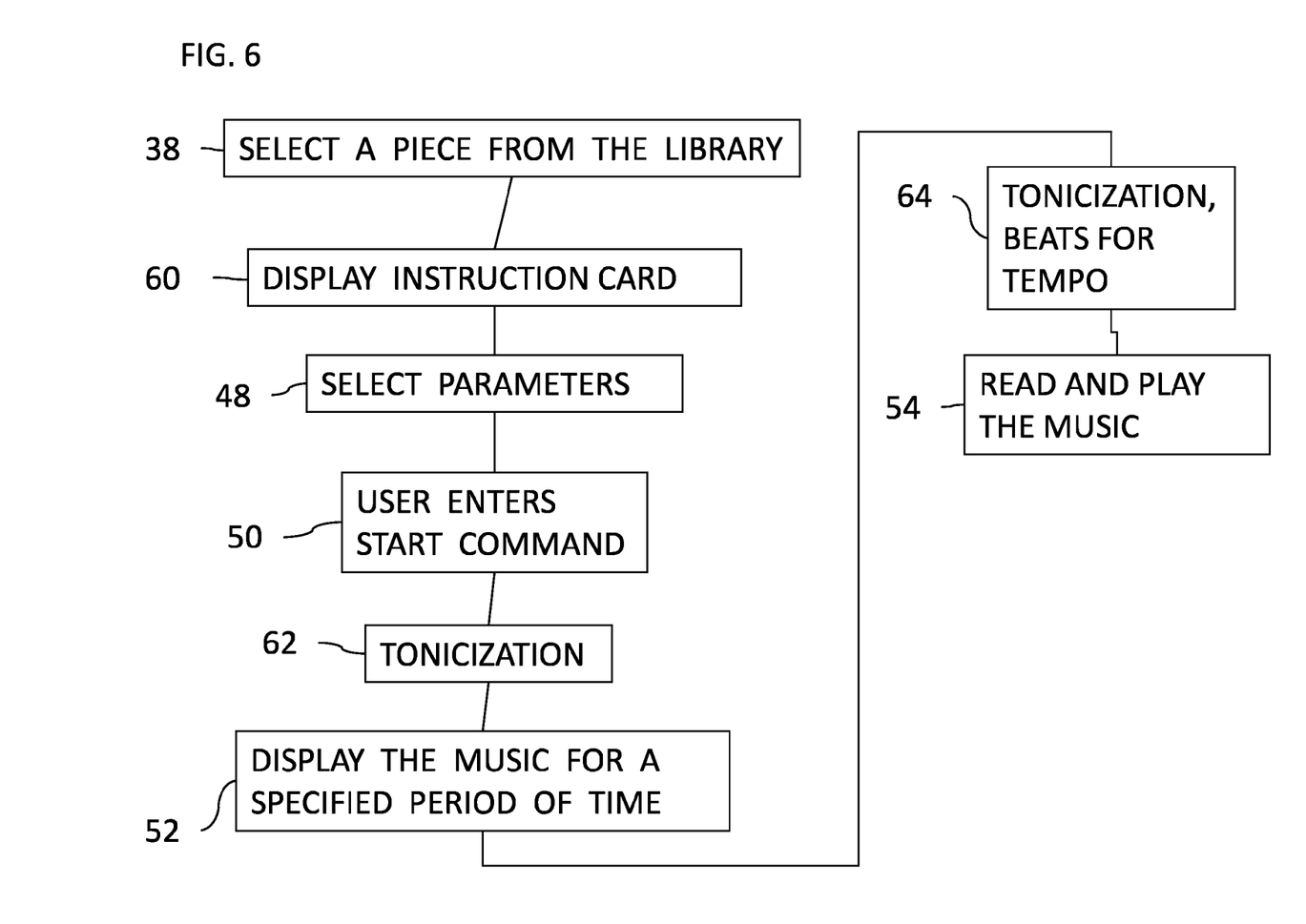

FIGS. 4, 5, and 6 are flowcharts showing aspects of how embodiment appliances are configured and used.

FIG. 4 is a high-level flowchart showing how an apparatus as described herein may be employed for an embodiment of a method for music instruction. Initially, music to be sight-read or practiced is downloaded (36) to the apparatus. This can, for instance, be done as a teacher assigns a unit of music to a student for sight-reading, practice for instruction, or preparation for performance. The music can have a specified tempo, such as the composer's chosen metronome marking. The music can be date-stamped with the date and time of downloading, so it can be documented when the student received it. Metadata associated with the music can identify what the student is to do with it. For instance, it might be an exercise to be prepared for use at the student's next lesson. Additional metadata can give the title, composer, publisher, copyright holder, and other descriptive information. The music can include a symbolic representation of sheet music, as described above. An audio recording can be provided along with the symbolic representation of the sheet music. The recording can include a part that the student is to play or sing, and/or a separate recording of the accompaniment that goes with the part the student is to play or sing.

The apparatus can include a user command input interface, which may be in the form of a displayed tool bar or the like. This can include a table of contents of a music library, such as the library 16 of FIG. 2. Using such a table of contents, the user can select (38) a piece of music from the library 16. For instance, the user may be a student, who selects an exercise assigned by a teacher and downloaded into the library 16 for that purpose. The user command input interface can also provide user input tools for pausing, changing tempo, repeating difficult sections, etc., and such user input tools may be designed so as to be intuitive to the user. In an embodiment, the controls may allow the user to choose their transposing or non-transposing instrument, and transpose the music from one key to another.

The user then proceeds to do the music reading exercise (40). This will be described in more detail below.

The apparatus may evaluate and record (42) the user's performance of the music. This recording can serve several purposes. First, a screen shot of the music, with incorrect music elements given as discussed below, can be provided to the user for viewing after the exercise is completed, as well as stored for uploading and archiving. The user can record and play back a practice session, which may give the user valuable insight into how he/she is doing, and what he/she sounds like. Since the apparatus may include pre-made recordings of the part the user is playing or singing, as well as the accompaniment, the user may play back his/her recording along with the recording of the same part, to notice differences, such as wrong notes, where they don't match. Also, the user can play back his/her performance along with the pre-recorded accompaniment, to let the user hear now his/her part fits with the accompaniment. It is also possible that the pre-recorded accompaniment can play back as the user is playing his/her part.

In addition to making and maintaining recordings of the user's work and evaluating the user's work by flagging mistakes for the feedback, the apparatus may compile statistics regarding the user's work and progress. For instance, compilations of mistakes may reveal an area of difficulty for the user. The user may then focus on the area of difficulty. Also, a teacher evaluating the statics might identify an area in which the student needs extra help. With this information, the teacher can tailor curricula to students to address their particular needs.

Once the user has completed his/her sight-reading and practice assignments, he/she may upload (44) the results, including the recordings and compiled statistics, etc. For instance, the student may upload to a teacher, to demonstrate completion of the work assignment, comparable to handing in homework. The teacher may then evaluate and archive (46) the student's work.

FIG. 5 is a flowchart showing, in more detail, the operation of an embodiment as illustrated in FIG. 4. Doing the sight-reading exercise (40) is here described in more detail.

When the user has selected (38) a piece from the library 16, the apparatus may display the music for a limited period of time to allow the user to view it. For educational purposes, this period of time may be specified by a teacher, or may be user-selectable. Before the user views the music, he/she can select parameters (48) such as tempo (user's choice, or the composer's metronome marking), transposition, volume, providing a starting pitch for sight-singing, etc. When the user is ready to start, he/she enters a command to start (50). At that time, the predetermined viewing period commences. The tonicization (e.g., the starting pitch, scale, arpeggio, etc.) is provided, if applicable, and a repetitive beat may be given, to set the specified or user-selected tempo.

The user then proceeds to sight-read the music (54) and play or sing it. As the user does so, the apparatus receives a signal (such as 26 in FIG. 2) representing the user's performance of the music. That may be an audio signal received through an input such as the microphone, or may be an electronic signal, such as a MIDI signal, received from an electronic instrument such as a keyboard. Recognition apparatus receives the user performance signals, and recognizes the music elements therein. For instance, the pitches played or sung can be identified using known techniques such as fast Fourier transforms. Rhythms can be recognized by identifying an initial transient (initial sound) for each note played or sung, and placing the various sound events within a time line defined by the beat pattern that set the tempo for the user to follow.

As the apparatus receives the music signal, it evaluates (56) the correctness using a comparison apparatus. The comparison apparatus employs information such as the symbolic representation of the music that was in the library 16, and the information about the user's performance produced by the recognition apparatus, and compares them. Correctly played music elements are found by matches, and mistakes are found by mismatches. For instance, it identifies any wrong notes that were played or sung. Given that the voice, and some instruments such as non-fretted strings and the trombone, can produce a continuum of pitches rather than the relatively more discrete pitches produced by most wind and fretted string instruments, poor intonation (playing or singing out of tune) can be perceived as wrong notes and flagged accordingly.

Where wrong notes or other mistakes are made, the apparatus provides feedback to the user at the conclusion of the performance, which may for instance take the form of color-coded notes. Thus the user has a chance to observe (58) feedback on how he/she is doing. More specifically, the visual feedback may include, for instance, a notation of the incorrect pitch actually performed, to contrast with the notated pitch. The wrong pitch (notated with visual contrast from the correct notes, such as by color-coding) can be positioned in place of the correct notated pitch. Also, incorrect rhythms can be notated, again with suitable visual contrast such as color-coding, to the left for an early performance or to the right for a late performance of notated rhythms. Other types of incorrect performance music elements can be shown similarly. In an embodiment, where the music to be sight-read is notated using a music notation editor application, the above-discussed incorrect music elements may be generated using the same music editor app.

FIG. 6 is another flowchart, showing additional aspects of the operation of embodiments such as those of FIGS. 4 and 5. Elements shown in FIG. 6 which correspond with those of FIGS. 4 and 5 are numbered correspondingly.

FIG. 6 represents a particular embodiment of certain aspects of the user interface. Selecting (38) a piece from the library 16, selecting (48) parameters, starting (50), displaying (52) the music, and reading (54) the music are generally as described above. In this embodiment, a graphical user interface menu of parameters is presented after the piece is selected (38), but before it is displayed to the user. In an embodiment, the parameter menu is displayed in the form of an instruction card (60). It may include user-selectable parameters, or the parameters may have been fixed by a teacher, where the sight-reading exercise is teacher-assigned.

The embodiment of FIG. 6 also provides for tonicization and a beat pattern. As discussed above, tonicization, such as a starting pitch, a scale or arpeggio, etc., may be useful for singers who will be sight-singing the music to be displayed. It is less likely to be of use to an instrumentalist, and thus is omitted for instrumental music exercises, etc.

The tonicization is provided audibly to the user (if the user is a singer, or otherwise has need of a tonicization), such as through the audio output 10 of FIG. 1. In this embodiment, tonicization (62) is given after the user enters (50) the Start command, at the beginning of the time interval within which the music is displayed (52). Thus, a singer can keep the tonicization in mind as he/she examines the music during the predetermined time period before sight-reading. Again, this tonicization (62) may be omitted for instrumentalists who have no need of it.

After the music display time has elapsed, another tonicization (optionally) and a beat pattern are provided (64). For instrumentalists, the tonicization itself may be omitted, as before. However, the beat pattern for setting tempo will essentially always be used, since singers and instrumentalists will both make use of it.

Sight-Reading Exercises

The music library 16 may contain a variety of types of musical selections. The library 16 is not limited to simple exercises showing individual notes, intervals, rhythms, etc., in the abstract. It may contain existing pieces of music, or excerpts from such pieces, which have been licensed or otherwise obtained from their owners or copyright holders. They may also be taken from the public domain. It may also include exercises written or selected for use in music education. The exercises may be organized into categories, units, etc., based on planned educational goals. For instance, an educational unit may include sets of pieces, within the library, organized to achieve educational goals. They may be organized sequentially by a particular skill or technique, or by increasing difficulty. Different levels of difficulty may be provided, and classified accordingly. Also, sublevels within a given level may provide a finer gradation of difficulty or subject matter. Exercises from these levels and sub-levels may be tailored to a particular student/user, to meet his/her needs for reading skill development. In an embodiment, the appliance 2 may select increasingly difficult exercises based on the user's performance in previous exercises. Users may add music selections to the library, for instance by generating them in symbolic notation using a music editor such as Finale, a music editor offered by MakeMusic, Inc. In an embodiment, music selections may test the user's skills as to pitches and rhythms, as the case may be.

Performance Evaluation: Grading, Archiving

Embodiments may be used for music education. For instance, a music teacher may prepare a lesson or unit including set of pieces of music, to be used for sight-reading instruction. The lesson or unit can include escalating levels of difficulty, or separate units that focus on different types of musical elements, e.g., a unit for pitches and a different unit for rhythms. A set of pieces may be assigned to the students by presenting them in a list for the student to choose them, which will download them into the students' appliances.

The content of the pieces of music can include method books such as those published and used by teachers and students for music education. Also, pieces of concert music to be prepared for performance can be used. In either case, where composers, publishers, etc., own rights to the music, license arrangements may be made with these parties, to allow their music to be distributed thusly, and then employed for music education as described herein.

As the users (such as students) employ methods and apparatus described herein to sight-read and learn music, they may receive feedback from the indicia (such as color coding) of correct and incorrect notes, rhythms, etc. The student's performance may be recorded, so that the student can play it back to check his/her work, or so teachers can upload the recording and screenshot for evaluation and archiving. Also, the users may listen to pre-existing recordings of the music, to further help them to learn how to perform it.

As the students/users complete music assignments within the unit, apparatus in an embodiment may compile data as to how the student did. This can include individual mistakes, to allow the teacher to judge how preparation of a particular piece is progressing. Also, statistics can be compiled, to help the teacher determine whether a given student has difficulty with any particular music elements. Such statistics can include overall percentages of correct pitches, rhythms, etc., and can break this information down into categories. For instance, the notes following wide interval leaps may tend to be wrong, or complex rhythms may tend to get the user off of the set tempo. This information may be used in an embodiment that proactively selects exercises for the user. The embodiment would present a specific level of sight reading music, and the user would perform it. Depending on the accuracy of the performance, the embodiment would then present the user would be presented with the same, more difficult or less difficult music, in a game-like fashion. This can be considered analogous to computer games which present the user with multiple different levels of difficulty.

Where the teacher is responsible for giving grades to students, the use of such apparatus and methods provide the teacher with evidence of student work and other objective information, which may make determination of grades valid and reliable, and subject to easy audit if it should be needed, and may also facilitate documentation of the reasons why particular grades are given.

A Commercial Embodiment

MakeMusic, Inc., the assignee of the present patent application, offers its SmartMusic software product, which may incorporate features and functionality as described herein. SmartMusic provides an accompaniment library for musicians of all ages and skill levels, including a catalog of musical repertoire required by music educators. Additional music can be added to SmartMusic through Finale, MakeMusic's notation software product.

SmartMusic also provides a practice environment for musicians. As music appears on the screen, the musician performs, and SmartMusic immediately displays the notes performed accurately in green and the notes performed inaccurately in red. For key solo titles, the SmartMusic product follows the tempo that musicians set, enabling them to express themselves through the music. The user may select a metronome function, which may produce a metronome signal such as an audible click to help the user stay at the correct tempo as he/she reads the musical exercise.

SmartMusic's e-learning capabilities are available to band, orchestra, choir and private educators at all levels and enable them to send a wide variety of assignments to students. The technology allows the teacher to view, listen to, and comment on students' performance.

Embodiments may be provided as computer program products, i.e., computer-readable media bearing software program code for directing a computer, electronic book, or other type of electronic appliance to provide digital sheet music display and audio playback, synchronized with each other, as generally described herein. Such computer-readable media might include an article of manufacture such as a pre-recorded CD, or might include download over the internet or other suitable communication media. Such computer program products might be commercialized and sold to buyers who own or possess general purpose electronic appliances, such that the software program code shall be installed on the general purpose electronic appliances to run thereon, and provide the user with functionality such as that described herein.

CONCLUSION

Although the disclosed embodiments have been described in detail with reference to particular elements and features, persons possessing ordinary skill in the art will appreciate that various modifications and enhancements may be made without departing from the spirit and scope of the claims that follow.

What is claimed is:

1. An apparatus for use by a user for reading music, the apparatus comprising:
   a library of music to be displayed;
   a display unit for displaying music selected from the library to a user;
   a timer for displaying the sheet music for a predetermined time period before the user begins sight-reading the displayed music;
   an input for receiving signals representative of sound produced by the user doing a sight-reading performance of the displayed music; and
   apparatus for assessing correctness of the user's sight-reading and for preserving a record of the user's sight-reading performance.

2. The apparatus of claim 1, wherein the library of sheet music includes representations of the sheet music in a symbolic format.

3. The apparatus of claim 1, wherein the user employs the apparatus for academic music study under a teacher's direction, and the predetermined time period before the user begins sight-reading the displayed sheet music is a time period determined by the teacher.

4. The apparatus of claim 1, further comprising an audio output for providing the use with one of (i) a starting pitch for sight-singing the displayed sheet music, and (ii) preparatory beats for establishing a tempo at which the sight-reading is to be done.

5. The apparatus of claim 1, wherein sheet music to be displayed by the display includes music elements including at least one of pitches and rhythms.

6. The apparatus of claim 1, wherein the apparatus for assessing correctness includes a recognition apparatus for recognizing the signals representative of sound produced by the user and received by the audio input, and a comparison apparatus for comparing the sound recognized by the recognition apparatus with the music elements.

7. The apparatus of claim 6, wherein the comparison apparatus determines whether each music element was sight-read correctly or incorrectly, and the display provides visual indicia of incorrectly sight-read musical elements.

8. The apparatus of claim 6, further comprising a statistics unit for compiling a statistical assessment of the user's sight-reading performance.

9. The apparatus of claim 1, further comprising a menu unit for displaying, on the display unit, a menu allowing the user to select music for sight-reading based on at least one of:
   levels of difficulty of the music to be sight-read, and
   music elements which are to be sight-read, the music elements including pitches and rhythms.

10. The apparatus of claim 1, wherein the library of music includes music for at least one of voice, woodwind, brass, percussion, strings, and an electronic keyboard.

11. A method for configuring an electronic appliance for use as a music sight-reading tool, the electronic appliance including a display, an audio output, and a music signal input, the method comprising:
   installing a library of music in notated form;
   installing an educational unit including a music sight-reading assignment for sight-reading a piece of music from the library, the music sight-reading assignment specifying one of (i) a musical instrument and (ii) a singing voice;
   specifying a predetermined period of time for a user to view the music on the display before beginning to sight-read the music;
   configuring the electronic appliance to receive an input signal representative of the user's sight-reading performance of the music; and
   configuring the electronic appliance to assess whether a user's music sight-reading performance correctly matches the piece of music from the library.

12. The method of claim 11, wherein the music sight-reading assignment includes specification of at least one of (i) a specified tempo, and (ii) a tonicization in which the music is to be sight-read.

13. The method of claim 12, wherein the music sight-reading assignment further includes at least one of (i) a specified audio signal to be output through the audio output of the electronic appliance, for facilitating the user to establish the desired performance tempo, and (ii) a tonicization signal for facilitating the user to establish the desired key in which the music is to be sight-read.

14. The method of claim 12, wherein the specification of a tonicization is provided if the music is to be sight-sung by a singer, and omitted if the music is to be sight-read by an instrumentalist.

15. The method of claim 11, wherein the music sight-reading assignment includes specification of the predetermined period of time for the user to view the music on the display before beginning to sight-read the music.

16. The method of claim 15, further comprising, responsive to user selection of a piece of music from the library, displaying instructions and a Start input for the user to activate when the user is ready to begin sight-reading the music, wherein, responsive to user activation of the Start input, the music is displayed for the specified period of time, and then the user is to begin sight-reading the music.

17. The method of claim 11, wherein:
   the educational unit includes musical elements; and
   the method includes, for a sight-reading assignment in which one of the musical elements is of interest:
      (i) selecting music from the library based on which musical elements the music contains, and
      (ii) enabling or disabling testing based on which music elements are of interest.

18. The method of claim 11, further comprising configuring the electronic appliance for providing the user with a visual record of the user's sight-reading performance.

19. The method of claim 11, further comprising configuring the electronic appliance for storing results of the user's sight-reading performance, and exporting the results of the user's sight-reading performance, whereby a teacher receiving the exported results can assess the user's sight-reading performance.

20. The method of claim 11, further comprising configuring the electronic appliance for displaying music from the library in a symbolic format on the display.

21. The method of claim 20, wherein the configuring for displaying music in a symbolic format includes configuring the electronic appliance to display a record of the user's sight-reading performance, with visual indicia of incorrectly sight-read musical elements.

22. The method of claim 21, wherein the visual indicia of incorrectly sight-read musical elements are displayed in the symbolic format in which the music is displayed.

23. The method of claim 11, wherein the library of music includes music for at least one of voice, woodwind, brass, percussion, strings, and keyboard.

* * * * *